H. W. YOUNGQUIST.
FILLING REPLENISHING LOOM.
APPLICATION FILED AUG. 28, 1919.

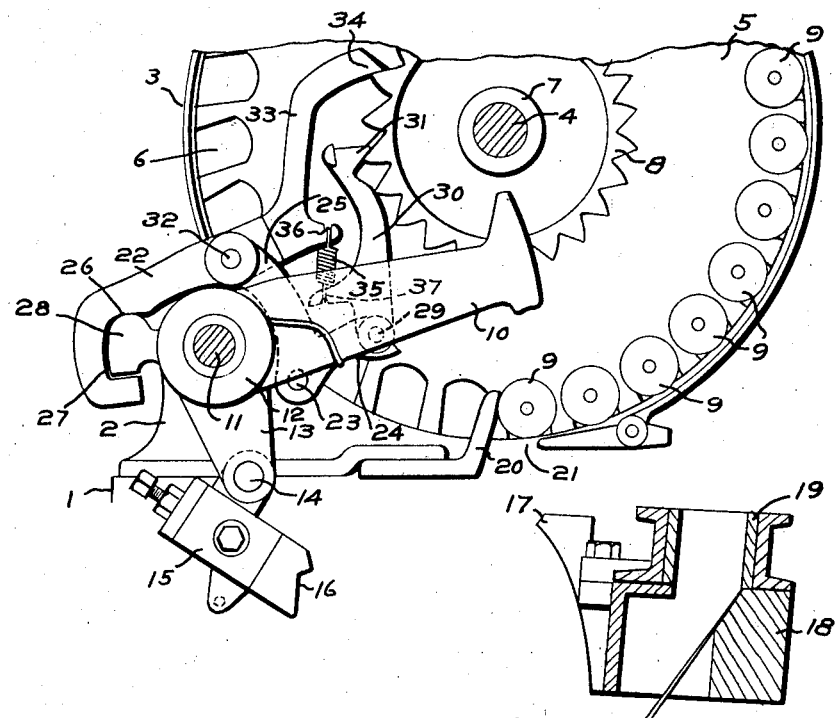
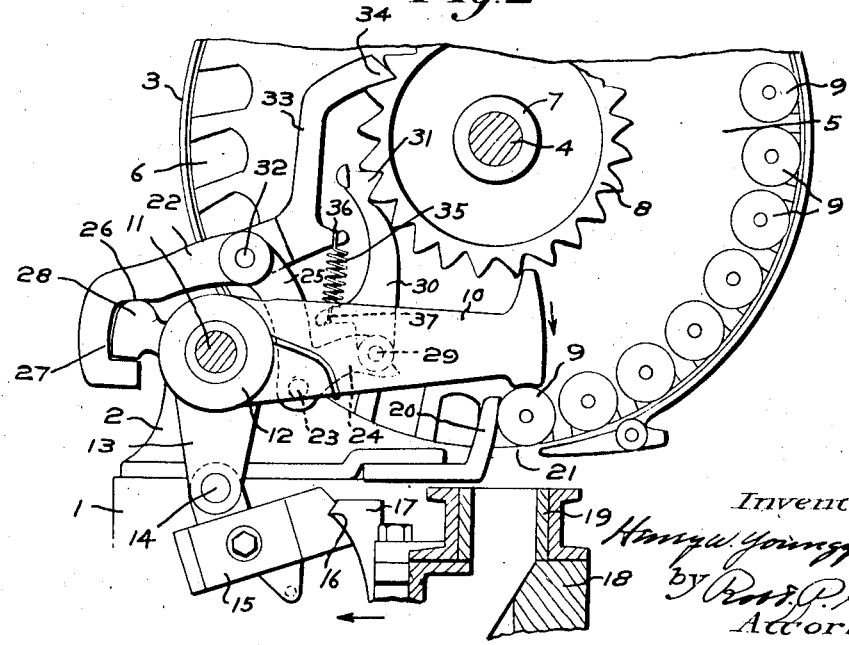

1,331,838.

Patented Feb. 24, 1920.
2 SHEETS—SHEET 2.

Inventor:
Henry W. Youngquist
by
Attorney

UNITED STATES PATENT OFFICE.

HENRY W. YOUNGQUIST, OF MANCHESTER, NEW HAMPSHIRE, ASSIGNOR TO DRAPER CORPORATION, OF HOPEDALE, MASSACHUSETTS, A CORPORATION OF MAINE.

FILLING-REPLENISHING LOOM.

1,331,838.    Specification of Letters Patent.    Patented Feb. 24, 1920.

Application filed August 28, 1919. Serial No. 320,456.

*To all whom it may concern:*

Be it known that I, HENRY W. YOUNGQUIST, a citizen of the United States, and a resident of Manchester, in the county of Hillsborough and State of New Hampshire, have invented an Improvement in Filling-Replenishing Looms, of which the following description, in connection with the accompanying drawings, in a specification, like characters on the drawings representing like parts.

This invention relates to filling replenishing looms and more particularly to means for controlling the battery or feeder by which filling carriers are presented for transfer from time to time.

In looms of the general type referred to, a rotatable hopper or feeder is supplied with a plurality of filling carriers, and by rotatable movement of the hopper or feeder from time to time, a filling carrier in the hopper or feeder is presented in position for transfer from the feeder to the shuttle. Various forms of mechanisms have heretofore been devised for effecting rotary movement of the hopper or feeder after each replenishing operation and some of these have worked effectively and satisfactorily in practice. It is important, however, that when a filling carrier is presented to transferring position by the transferrer, that it shall be accurately positioned for transfer, because the transferrer itself moves in a predetermined fixed path. Should the filling carrier not be properly positioned for transfer when the transferrer operates, damage is liable to result either to the mechanical parts or to the filling carrier and its load of filling.

When the loom attendant or weaver finds the supply of filling carriers in the hopper or feeder is nearly depleted, or when there are only a few filling carriers left in the hopper or feeder, the attendant or weaver places a fresh supply of filling carriers therein. In doing this it is usual to disengage the feeder advancing and holding means so that the attendant may easily rotate the feeder by hand. When the task of supplying the feeder has been completed, the attendant may neglect to rotate the feeder to properly present the filling carrier next to be transferred, to its proper transferring position, and if, under these conditions, the transferrer should operate, injury, hereinbefore noted, is liable to result.

With these conditions in view, the present invention has for one of its objects the provision of means for insuring a proper position of the filling carrier to be transferred and effectually holding the feeder with the filling carrier in transferring position, during the operation of the transferrer.

An important feature of the present invention, therefore, consists of a feeder advancing dog and a feeder holding detent which, during the operation of the transferrer, are moved in opposite directions, to force the filling carrier which is to be transferred, against an abutment and retract the feeder advancing dog in its idle stroke. This feature of the invention, in the present instance, is contrived by a rocking lever pivotally mounted independently of the transferrer and having connected thereto at points at opposite sides of its pivotal mounting, the feeder advancing dog and the feeder holding detent. To effect rocking movement of the rocking lever during transfer to effect the purposes hereinbefore generally stated, the rocking lever has an operating connection with the transferrer, and the feeder advancing dog and holding detent are held in engagement with the ratchet wheel of the feeder by spring means, which preferably connects the two.

In order that the feeder may hold a filling carrier accurately in transferring position, it is desirable that the feeder be held from either advancing or retrograde movement during the transferring operation, and in this respect the present invention contemplates that the engaging end portions of the feeder advancing dog and holding detent fill the space between the adjacent teeth of the ratchet wheel connected to the feeder and that the spring connection between the dog and detent may serve to hold the ends in engagement with the teeth.

Other features of the invention and novel combinations of parts will hereinafter be described in connection with the accompanying drawings which show one good practical form of the present invention.

In the drawings:

Figure 1 is a transverse section through the feeder and transferrer mechanism, showing the association of the present invention therewith, and the parts in position in which they may be left by the loom attendant after supplying the feeder with filling carriers;

Fig. 2 is a view similar to that of Fig. 1 showing the action of the parts during the transferring movement of the transferrer;

Figure 3:
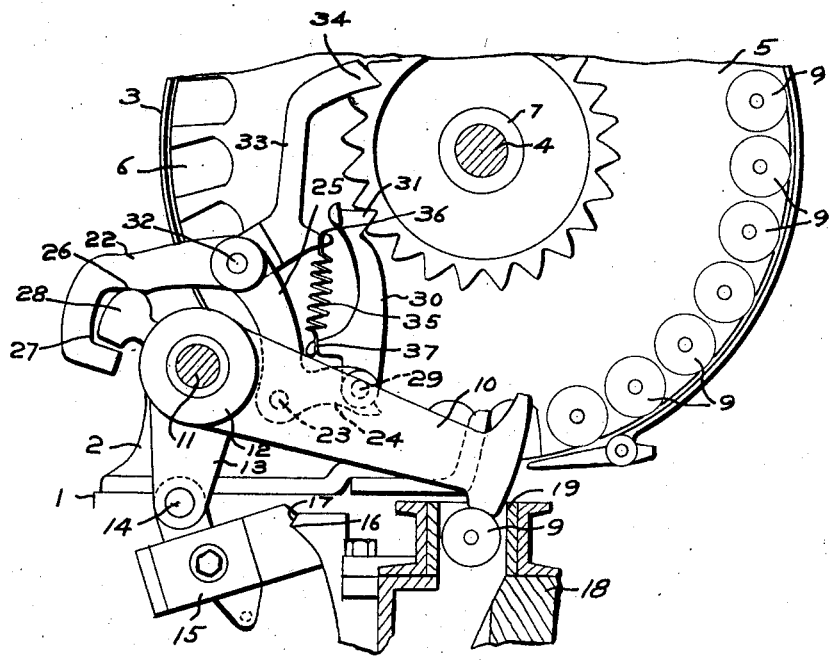
Fig. 3 is a view similar to that of Figs. 1 and 2 showing the position of parts as the transferrer reaches its final position in the transfer of a filling carrier from the feeder to the shuttle.
Figure 4:
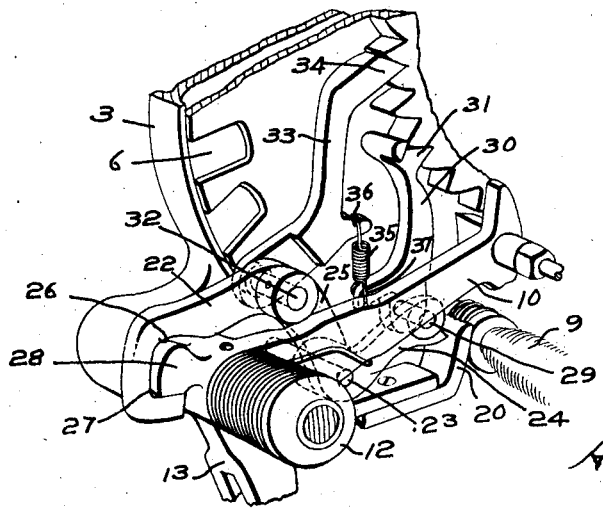
Fig. 4 is a detached perspective view showing the position of parts after a filling replenishing operation.

The loom frame 1 may be of usual construction and provided with a supporting bracket 2 for the feeder stand 3. The feeder stand 3 is provided with the supporting stud 4 on which is rotatably mounted the feeder 5, only one end of which is herein illustrated, it being understood that the feeder 5 may be of usual construction, wherein two heads are employed, one supplied with recesses 6 for the reception of the butt or head ends of the bobbin or filling carriers, and the other of which may be provided with suitable holding means for the tip end portions of the filling carriers or bobbins. The two heads are connected by a sleeve 7 and the feeder is provided with a ratchet wheel 8 by which the feeder will be rotated from time to time to bring the filling carriers 9, one by one, into transferring position.

The transferrer 10 is of usual character and mounted for rocking movement upon the stud 11 supported by the stand 2, or other convenient supporting means. Projecting downwardly from the hub 12 of the transferrer is the arm 13 to which is pivotally connected at 14 the rocking member or finger 15, the end 16 of which is adapted, on call for replenishment of filling, to be raised into the path of the bunter 17 carried by the lay 18, the construction being such that upon call for replenishment of filling by the feeler or detecting mechanism, which forms no part of the present invention, the member 15 will be raised from the position indicated in Fig. 1 to that indicated in Fig. 2, and upon advancing movement of the lay 18 the bunter 17 will engage the end 16 of the finger 15 and effect clockwise movement of the transferrer 10, as indicated in Fig. 2, to transfer the filling carrier which is in transferring position, to the shuttle 19 beneath.

The parts so far described may be of the usual character now commonly used on filling replenishing looms.

When a filling carrier is in transferring position, as indicated in Fig. 2, it should bear firmly against the abutment 20 and be held in such firm engagement with the abutment during downward movement of the transferrer which effects the transfer of the filling carrier through the throat 21 to the shuttle beneath. When the weaver or loom attendant has finished supplying the feeder with filling carriers, the filling carrier next to be transferred may not have been placed in proper transferring position, and should the transferrer operate under such conditions, breakage or other injury is liable to occur.

Pivotally mounted at a fixed point relative to the loom frame is a rocking lever 22 which has associated therewith the feeder advancing dog and the feeder holding detent which, upon rocking movement of the rocking lever, act through the ratchet wheel 8 to lock or hold the filling carrier to be transferred, firmly against the abutment 20 and for the action of the transferrer.

The rocking lever 22, in the present instance of the invention, is pivoted at 23 to the bracket 2 and has the upwardly extending arms 24 and 25, the latter of which is extended frontwardly as at 26 and is provided at its front end portion with a recess 27 in which is received the projection or knob 28 extending from the hub 12 of the transferrer, the construction being such that the rocking lever 22 may be rocked upon its pivotal mounting 23 by movement of the transferrer.

Pivotally mounted at 29 on the arm 24 of the rocking lever, is the feeder advancing dog 30 having the teeth-engaging portion 31 which, when the dog is moved into engagement between the teeth, strikes directly between the teeth and prevents wear.

Pivotally mounted at 32 upon the rocking lever 22, is the feeder holding detent 33, the end portion 34 of which is adapted to strike directly between the teeth of the ratchet 8 and hold or lock the feeder from either advancing or retrograde movement, as will more fully appear.

The feeder advancing dog and the feeder holding detent are normally pressed inwardly to engage the teeth of the ratchet 8, and such inward pressure is preferably effected by a spring. In the present instance a spring 35 has one end connected at 36 to the feeder holding detent and its other end connected at 37 to the feeder advancing dog, the reaction of the spring upon the dog and detent serving to mutually throw the engaging ends of the dog and detent directly into the space between the teeth of the ratchet wheel 8.

As indicated in Fig. 1, the loom attendant or weaver, after having filled the feeder with filling carriers, may leave it with the filling carrier next to be transferred not in proper bearing position against the abutment 20, and should the transferrer operate at this time injury is liable to be done either to the mechanical parts or to the filling carrier itself, unless the filling carrier to be transferred is properly positioned as the transferrer moves in its transferring stroke. On call for filling replenishment, with the parts positioned as indicated in Fig. 1, and the filling carrier next to be transferred not directly positioned for transfer, the first effect of the transferring movement of the transferrer is to rock the rocking lever 22, with the result that the feeder holding detent 33 is moved upwardly, causing its toothed end to engage directly between the teeth of the ratchet wheel 8 and force the ratchet wheel and its connected feeder in a clockwise direction, viewing Figs. 1 and 2. This movement of the feeder by the feeder holding detent 33 causes the filling carrier 9, next to be transferred, to be pressed firmly against the abutment 20 into proper transferring position, so that as the transferrer moves downwardly from the position indicated in Fig. 1 to that indicated in Fig. 2, it will encounter the properly positioned filling carrier and effect its transfer to the shuttle beneath.

Simultaneously with the rocking movement of the lever 22, as hereinbefore stated, the feeder advancing dog 30 is given its retracting stroke to cause its engaging end 31 to click over the teeth of the ratchet wheel 8 and take a new hold of the teeth by engaging directly between the next lower pair. Owing to the separating movement of the feeder holding detent, and feeder advancing dog, the spring 35 is placed under increased tension, as indicated in Figs. 2 and 3, the effect being to forcibly cause the holding detent and advancing dog to act with increased energy in their engagement with the ratchet wheel 8. As the transferrer 10 is moved from the position in Fig. 2 to that of Fig. 3, wherein the filling carrier is shown as having been transferred from the feeder to the shuttle, the tension of the spring 35 will be further increased. The action of the spring 35 and the feeder holding detent 34, as the transferrer moves in its operating stroke, is to force the filling carrier next to be transferred, firmly against the abutment 20, and lock the feeder from retrograde movement during the further action of the transferrer. As the transferrer returns from having effected the transfer of the filling carrier from the feeder to the shuttle, it causes a rocking movement of the locking lever 22 in the opposite direction, or contraclockwise, viewing Figs. 1, 2 and 3, thereby lifting the feeder advancing dog and causing rotary movement of the feeder to bring a fresh filling carrier into position for transfer and moving the holding detent 33 in its idle stroke to make fresh engagement with the next pair of ratchet teeth on the ratchet wheel 8.

The operative engagement between the rocking lever 20 and the transferrer may be variously contrived, the essentials in this respect being during movement of the transferrer either during its transferring action or its retrograde movement; rocking movement may be imparted to the rocking lever to effect movement of the feeder advancing dog and feeder holding detent in a direction of separation, to effectively force the filling carrier next to be transferred against the abutment 20 and then in a direction of approach to cause the advancing dog to rotate the hopper and bring a fresh filling carrier in position for transfer.

Claims:

1. A rotatable filling feeder to hold a series of filling carriers, a ratchet wheel connected to the feeder, a transferrer for transferring the filling carriers one by one from the feeder to the shuttle, a rocking lever pivotally supported at a fixed point by the loom frame, a feeder advancing dog or pawl mounted on the rocking lever at one side of its pivotal connection with the loom frame, a feeder holding detent mounted on the rocking lever at the opposite side of the pivotal connection, a spring connecting the advancing dog and holding detent, and a lug carried by the transferrer and engaging the rocking lever for rocking it positively first in one and then in the opposite direction to cause the holding detent to act through the ratchet wheel to insure proper position of the filling carrier to be transferred, and the advancing dog or pawl to move in its idle stroke into engagement between teeth of the ratchet wheel.

2. A rotatable filling feeder for holding a plurality of filling carriers, an abutment against which a filling carrier bears when in transferring position, a transferrer for transferring a filling carrier from the feeder to the shuttle, a ratchet wheel connected to the feeder, a rocking lever mounted independently of the transferrer, a feeder advancing dog and a feeder holding detent connected to the rocking lever and movable by it in opposite directions when the lever is rocked, a spring connecting the dog and detent and acting to maintain them in engagement with the ratchet wheel, and connections between the rocking lever and transferrer for rocking the lever first in one and then in the opposite direction.

3. A rotatable filling feeder for holding a plurality of filling carriers, an abutment against which a filling carrier bears when in transferring position, a transferrer for transferring a filling carrier from the feeder to the shuttle, a ratchet wheel connected to the feeder, a rocking lever which is mounted on a pivot independent of the transferrer, a feeder advancing dog and a feeder holding detent carried by the rocking lever and movable in different directions as the lever is rocked, and connections between the rocking lever and transferrer for causing the feeder detent to force the filling carrier next to be transferred against the abutment and lock the feeder during the transferring movement of the transferrer.

4. A rotatable filling feeder for holding a plurality of filling carriers, an abutment against which a filling carrier bears when in transferring position, a transferrer for transferring a filling carrier from the feeder to the shuttle, a rocking lever pivotally mounted between its ends, a feeder advancing dog and a feeder holding detent pivotally connected to the rocking lever, and means for rocking the lever to cause the holding detent to force a filling carrier against the abutment as the transferrer moves in transferring a filling carrier to the shuttle.

5. A rotatable filling feeder for holding a plurality of filling carriers, a ratchet wheel connected thereto, an abutment against which a filling carrier bears when in transferring position, a transferrer, a rocking lever having its fulcrum at a fixed point and carrying a feeder holding detent which effects movement of the rotary feeder to force a filling carrier against the abutment during the operating or transferring part of the stroke of the transferrer, and a feeder advancing dog carried by the rocking lever for advancing the feeder to bring another filling carrier to transferring position during retrograde movement of the transferrer.

6. A rotatable filling feeder for holding a plurality of filling carriers, a ratchet wheel connected thereto, an abutment against which a filling carrier bears when it is in transferring position, a transferrer, a rocking lever fulcrumed at a point independent of the transferrer, two members carried by the rocking lever and each acting through the ratchet wheel to move the feeder in a direction of advance, one to force the filling carrier to be transferred against the abutment during the active stroke of the transferrer, and the other to place another filling carrier in transferring position, and connections between the rocking lever and transferrer to operate the former.

7. A rotatable filling feeder for holding a plurality of filling carriers, a ratchet wheel connected thereto, an abutment against which a filling carrier bears when it is in transferring position, a transferrer, a rocking lever fulcrumed at a point independent of the transferrer, two members carried by the rocking lever and each acting through the ratchet wheel to move the feeder in a direction of advance, one to force the filling carrier to be transferred against the abutment during the active stroke of the transferrer, and the other to place another filling carrier in transferring position, a spring connecting said two members, and connections between the rocking lever and transferrer to operate the former.

8. A rotatable filling feeder for holding a plurality of filling carriers, a ratchet wheel connected thereto, an abutment against which a filling carrier bears when it is in transferring position, a transferrer, a rocking lever fulcrumed at a point independent of the transferrer, two members carried by the rocking lever and each acting through the ratchet wheel to move the feeder in a direction of advance, one to force the filling carrier to be transferred against the abutment during the active stroke of the transferrer, and the other to place another filling carrier in transferring position, means for effecting positive movement of the rocking lever in both directions by movement of the transferrer, and connections between the rocking lever and transferrer to operate the former.

9. A rotatable feeder for holding filling carriers, an abutment against which a filling carrier bears when in transferring position, a transferrer, a rocking lever fulcrumed at a point independent of the transferrer and having two feeder moving members mounted thereon each acting upon the feeder to rotate it in the same direction, one for forcing a filling carrier against the abutment during the downward movement of the transferrer, and the other to place another filling carrier in position for transfer on the upward movement of the transferrer, and means for rocking the rocking lever.

In testimony whereof I have signed my name to this specification.

HENRY W. YOUNGQUIST.